US008213740B1

(12) United States Patent
Rikoski

(10) Patent No.: US 8,213,740 B1
(45) Date of Patent: Jul. 3, 2012

(54) COHERENT IMAGE CORRELATION

(75) Inventor: Richard Rikoski, Alameda, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 563 days.

(21) Appl. No.: 12/454,485

(22) Filed: May 18, 2009

(51) Int. Cl.
*G06K 9/64* (2006.01)

(52) U.S. Cl. ......... 382/278; 342/25; 348/208; 359/558; 367/103; 367/88; 367/89; 378/8; 382/103; 382/211; 600/447; 702/14

(58) Field of Classification Search ......................... None
See application file for complete search history.

(56) References Cited

U.S. PATENT DOCUMENTS

| | | | | |
|---|---|---|---|---|
| 5,020,111 | A * | 5/1991 | Weber | 382/211 |
| 5,148,315 | A * | 9/1992 | Tamari | 359/558 |
| 5,160,931 | A * | 11/1992 | Brown | 342/25 C |
| 5,177,710 | A * | 1/1993 | Gilmour et al. | 367/88 |
| 5,315,562 | A * | 5/1994 | Bradley et al. | 367/89 |
| 5,332,999 | A * | 7/1994 | Prati et al. | 342/25 F |
| 5,422,860 | A * | 6/1995 | Bradley et al. | 367/89 |
| 5,805,098 | A * | 9/1998 | McCorkle | 342/25 F |
| 5,806,521 | A * | 9/1998 | Morimoto et al. | 600/447 |
| 5,973,634 | A * | 10/1999 | Kare | 342/25 A |
| 5,991,460 | A * | 11/1999 | Mitchell | 382/278 |
| 6,088,295 | A * | 7/2000 | Altes | 367/103 |
| 6,236,705 | B1 * | 5/2001 | Stergiopoulos et al. | 378/8 |
| 6,424,287 | B1 * | 7/2002 | Doerry et al. | 342/25 R |
| 6,535,570 | B2 * | 3/2003 | Stergiopoulos et al. | 378/8 |
| 6,549,853 | B2 * | 4/2003 | Chakraborty et al. | 702/14 |
| 7,259,715 | B1 * | 8/2007 | Garren et al. | 342/179 |
| 7,791,529 | B2 * | 9/2010 | Filias et al. | 342/115 |
| 7,898,457 | B2 * | 3/2011 | Jahangir | 342/25 A |
| 7,940,959 | B2 * | 5/2011 | Rubenstein | 382/103 |
| 2002/0173916 | A1 * | 11/2002 | Chakraborty et al. | 702/14 |
| 2006/0152589 | A1 * | 7/2006 | Morrison et al. | 348/208.1 |
| 2010/0074057 | A1 * | 3/2010 | Bachelor et al. | 367/103 |

\* cited by examiner

*Primary Examiner* — Anand Bhatnagar
*Assistant Examiner* — Tsung-Yin Tsai
(74) *Attorney, Agent, or Firm* — James T. Shepherd

(57) ABSTRACT

Systems and methods for coherent image correlation are provided. The systems include sonars with overlapping frequencies that observe terrain from overlapping aspects to form sonar images. First and second sonar images are formed and are grazing angle compensated. The first image is formed using the open or closed aperture theorem. Forming the second image using the open or closed aperture theorem constraint is optional. If the first and second images are not aligned, a range of possible rotations can be defined and image pairs can be created for a sampling of rotational angles. In addition, the images can be aspect compensated to remove windowing and beam pattern effects, if necessary. Once both images are grazing angle compensated and aligned, values are calculated for each possible image shift. To obtain a correlation image, the correlation coefficient for each possible image shift is calculated.

14 Claims, 2 Drawing Sheets

COHERENT IMAGE CORRELATION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

This patent application is related to co-pending patent applications entitled COMPENSATING SONAR IMAGES FOR DIFFERENCES IN TARGET ASPECT, Ser. No. 12/802,453, filed May 17, 2010, CORRELATION IMAGE DETECTOR Ser. No. 12/454,484, filed May 18, 2009, GRAZING ANGLE COMPENSATION, Ser. No. 12/802,454, filed May 17, 2010 and SPATIALLY INVARIANT IMAGE FORMATION USING OPEN AND CLOSED APERTURES, Ser. No. 12/454,486, filed May 18, 2009, all these co-pending applications being by the same inventor as this application.

BACKGROUND OF THE. INVENTION (1) Field of the Invention

The present invention relates to correlating sonar images and more specifically to systems of sonar transmitters/receivers (also referred to herein as sonars) with overlapping frequencies that observe terrain from overlapping aspects, methods for converting sonar images into forms that can be correlated, and for coherent correlation of the images.

(2) Description of the Prior Art

As is known in the art, coherent sonar image correlation is difficult to achieve. This is generally attributed to the tendency of sonar images to change dramatically in response to small changes in angle. Reasons why sonar images of the same terrain fail to correlate include lack of frequency overlap, lack of aspect overlap, and sonar artifacts.

If an object is observed with different frequencies it will not correlate since correlation involves multiplication in the frequency domain. If the frequency domain extent of one signal does not overlap with the extent of the other, the multiplication will yield no non-zero region, and the signals will not correlate. In order for correlation to occur there must be overlapping frequency bands.

Less intuitive is the effect of aspect angle. Like frequencies, aspect angles also correspond to regions in the frequency domain. When two images that are composed of measurements made from non-overlapping aspects are correlated, their frequency domain multiplication yields no non-zero region, leading to zero correlation. In order for correlation to occur there must be overlapping observation angles.

Unfortunately, observing targets over the same range of angles in three dimensions is difficult, as it requires planar arrays that conform to the open/closed aperture theorem. Therefore, it is usually impossible to achieve vertical or grazing angle overlap. Even if vertical or grazing angle overlap is achieved, the constraint of observing the subject terrain over the same horizontal aspects remains.

What are needed are systems and methods for converting sonar images into a form which can be correlated and for correlating coherent sonar images.

SUMMARY OF THE INVENTION

It is therefore a general purpose and primary object of the present invention to provide systems and methods for coherent image correlation. The systems include sonars with overlapping frequencies that observe terrain from overlapping aspects to form sonar images. First and second sonar images are formed and are grazing angle compensated.

Grazing angle compensation projects the data onto a representation of the sea floor. This causes a scaling of frequencies. The simplest form of grazing angle compensation assumes a flat bottom and the sonar operating at a constant altitude. More advanced algorithms project the image onto terrain with relief, which scales the frequencies in a more complicated manner.

The first image is formed using the open/closed aperture theorem (alternately and interchangeably referred to herein as the "open or closed aperture theorem", or "open and closed aperture theorem"). The open or closed aperture theorem constraint for the second image is optional. An ideal open or closed aperture image is an image where all points in the image are observed over the same range of angles. Such images are typically formed by broadside, squinted, or circular Synthetic Aperture Sonars (SAS's). A suboptimal system observes points over different ranges of angles.

The second image can be formed using either a real aperture or SAS image projected onto the sea floor. The first and second image must have overlapping terrain, frequencies, and aspects. If the images are not of the same terrain, are made using two frequency bands that have no overlap after grazing angle compensation, or are made from non-overlapping aspects they will not correlate.

If the first and second images are not aligned, the images are rotated so that they are aligned. If the correct rotation is not known, a range of possible rotations is defined, and image pairs are created for a sampling of rotational angles. In addition, the images can be aspect compensated to remove windowing and beam pattern effects, if necessary.

Once both images are grazing angle compensated and aligned, values are calculated for each possible image shift. To obtain a correlation image, the correlation coefficient for each possible image shift is calculated.

In one embodiment, a method of coherent image correlation comprises the steps of obtaining an open/closed aperture theorem conformal image; obtaining a second image, the conformal image and the second image being either a sonar or a radar image; grazing angle compensating the conformal image and the second image; and correlating the conformal image and the second image.

In another embodiment, correlating comprises calculating a correlation coefficient $\rho$ corresponding to each possible image shift $(\Delta x, \Delta y)$. Calculating a correlation coefficient comprises obtaining a correlation image $\rho(\Delta x, \Delta y)$ based on $$\rho_{12}(\Delta x, \Delta y) = \frac{\sigma_{12}(\Delta x, \Delta y)}{\sigma_1 \sigma_2},$$

where $$\sigma_n^2 = \int\int I_n^2(x, y) dx dy - \mu_n^2,$$

$\mu_n = \iint I_n(x,y)dxdy$, $\sigma_{12}(\Delta x, \Delta y) = \iint I_1(x,y) I_2(\Delta x - x, \Delta y - y) dxdy - \mu_1 \mu_2$, and $I_1(x,y)$ and $I_2(x,y)$ denote the conformal image and the second image, respectively.

In another embodiment, the method further comprises compensating for phase artifacts in the conformal image and the second image prior to correlating. Compensating can comprise removing said artifacts via deconvolution. Compensating can also comprise obtaining a first frequency domain image $I_1(k_x,k_y)=F(k_x,k_y)P_1(k_x,k_y)$ for the conformal image, $I_1(x,y)=F(x,y)*P_1(x,y)$, where $F(x,y)$ corresponds to a scene imaged in the conformal image and the second image, $P_1(x,y)$ denotes a point spread function of the conformal image, and $k_x$ and $k_y$ are the respective frequency domain equivalents of x and y; obtaining a second frequency domain image $I_2(k_x,k_y)=F(k_x,k_y)P_2(k_x,k_y)$ for the second image, $I_2(x,y)=F(x,y)*P_2(x,y)$, where $P_2(x,y)$ denotes a frequency domain point spread function of the second image; multiplying the first frequency domain image by the frequency domain point spread function of the second image; and multiplying the second frequency domain image by the frequency domain point spread function of the conformal image.

In another embodiment, the method further comprises, prior to correlating, determining if alignment data is available; and aligning the conformal image and the second image prior by rotating either the conformal image or the second image through a rotation obtained from the alignment data.

In another embodiment, the method further comprises rotating, prior to correlating and when alignment data is not available, either the conformal image or the second image through a sample rotation; recursively correlating and incrementing the sample rotation until a predetermined total rotation is reached so as to obtain a plurality of correlation images; and choosing the correlation image containing the highest correlation coefficient.

In another embodiment, grazing angle compensation comprises scaling a pitch of each echo forming the conformal image and the second image by a secant of an angle between the echo and the surface reflecting the echo.

In one embodiment, a method of coherent image correlation comprises the steps of obtaining an open/closed aperture theorem conformal image, $I_1(x,y)$; obtaining a second image, $I_2(x,y)$, where the conformal image and the second image can be either sonar images or radar images; grazing angle compensating the conformal image and the second image; and compensating for phase artifacts in the conformal image and the second image. When alignment data is available, the method aligns the conformal image and the second image prior by rotating either the conformal image or the second image through a rotation obtained from the alignment data. When alignment data is not available, rotating either the conformal image or the second image through a sample rotation. The method obtains a correlation image $\rho(\Delta x, \Delta y)$ based on $$\rho_{12}(\Delta x, \Delta y) = \frac{\sigma_{12}(\Delta x, \Delta y)}{\sigma_1 \sigma_2},$$

where $$\sigma_n^2 = \int\int I_n^2(x,y)\,dx\,dy - \mu_n^2,$$

$\mu_n = \iint I_n(x,y)dxdy$, and $\sigma_{12}(\Delta x,\Delta y) = \iint I_1(x,y)I_2(\Delta x-x,\Delta y-y)dxdy - \mu_1\rho_2$. When alignment data is not available, the method recursively correlates and increments the sample rotation until a predetermined total rotation is reached so as to obtain a plurality of correlation images, and chooses the correlation image containing the highest correlation coefficient.

In another embodiment, compensating for phase artifacts comprises removing the artifacts via deconvolution. In another embodiment, compensating comprises multiplying a frequency domain image of the conformal image by a frequency domain point spread function of the second image; and multiplying a frequency domain image of the second image by a frequency domain point spread function of the conformal image.

In another embodiment, grazing angle compensation comprises scaling a pitch of each echo forming the conformal image and the second image by a secant of an angle between the echo and the surface reflecting the echo.

In one embodiment, a system for correlating coherent images comprises a first sonar transmitter/receiver and a second sonar transmitter/receiver. The transmitter/receivers have overlapping frequencies and observe terrain from overlapping aspects. The system also comprises a processor in communication with the transmitter/receivers; and a processor program product disposed on a processor readable medium, and having instructions for causing the processor to compensate the images for grazing angle and to correlate the images.

In another embodiment, the processor program product has further instructions for compensating for phase artifacts in the first and second transmitter/receivers. The instructions cause the processor to multiply a frequency domain image of a first one of the images by a frequency domain point spread function of the second one of said images; and multiply a frequency domain image of the second one of the images by a frequency domain point spread function of the first one of the images.

In another embodiment, the instructions for causing the processor to compensate for grazing angle comprise instructions for causing the processor to scale a pitch of each echo forming the images by a secant of an angle between the echo and the terrain.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
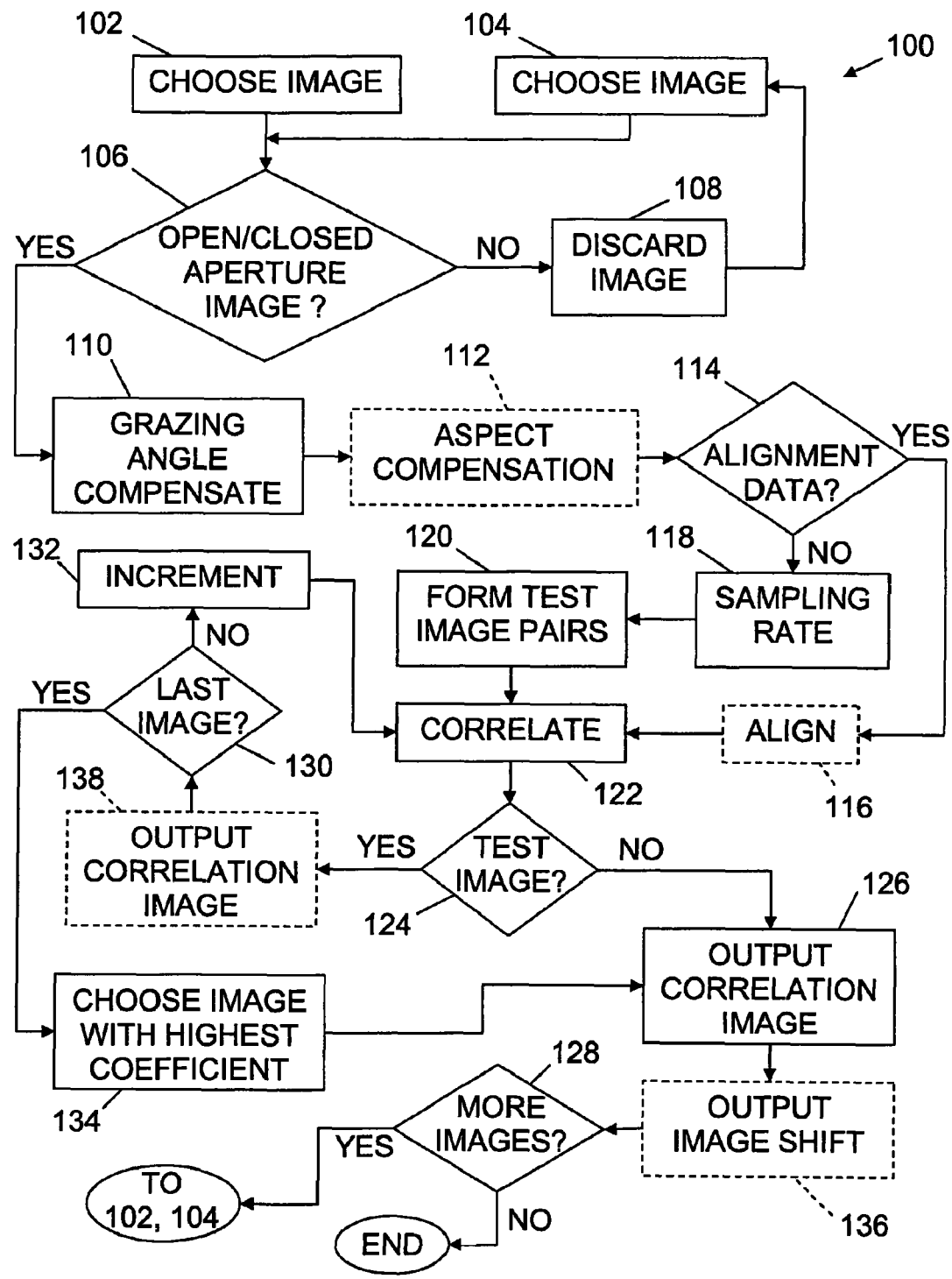
FIG. 1 illustrates a block diagram of a method for implementing coherent image correlation.

Referring now to FIG. 1, there is shown a block diagram of method 100 for implementing coherent image correlation. At blocks 102 and 104, the first and second images to be correlated are chosen, respectively. It can be understood that in real time operation of method 100, choosing images at blocks 102 and 104 is equivalent to forming images.

In order for images to correlate, the subject terrain needs to be observed over the same horizontal aspects. Observing the subject terrain over the same horizontal aspects can be achieved by forming an image that conforms to the open/closed aperture theorem, meaning that all points in the image are observed over the same range of angles. This requires a fixed angular aperture, rather than a fixed spatial aperture.

Alternatively, the angular aperture can vary provided that there is a core angular aperture that is contained for all points. In this scenario, the core angular aperture provides the basis for correlation; the additional angular aperture simply provides enhanced resolution should the correct correlation occur at a location in the images where they both contain additional overlapping angular aperture. If all points in the images are formed using angular apertures with some overlapping extent the images will correlate. Images that conform to the open/closed aperture theorem are typically formed by broadside, squinted, or circular Synthetic Aperture Sonars (SAS's).

Block 106 determines if at least one of the images has been formed using the open or closed aperture theorem. If not, block 108 discards one image and returns to block 104 to chose, or form, another image until at least one image is so formed. If one image is formed by the open or closed aperture theorem, the other image can be either a real aperture or SAS image.

The simplest case is correlating two open/closed aperture images. In this case, all points in the images are observed with the same set of angles and frequencies. The more advanced case concerns correlating an open/closed aperture image with a real aperture image. Each point in the real aperture image will only be observed from one vantage point, but the images will still correlate if the open/closed aperture image has information about the appropriate aspects for each point. The real aperture correlation will be lower, but it will still correlate.

Once two images of an image pair for correlation are chosen, or formed, the images are grazing angle compensated at block 110. As used herein, grazing angle is defined as the angle between the sound impinging on the sea floor and the sea floor itself. It is the angle between a ray connecting the sonar to a point on the sea floor and a ray tangent to the sea floor at that point. When looking at the horizon, the grazing angle would be zero. When looking straight, down at the seafloor, the grazing angle is 90°.

On a flat bottom at a constant altitude, grazing angle varies with range. At a constant horizontal range, grazing angle changes as the vertical position of the sonar is varied. For a contoured bottom, changes in the bottom slope can also affect the grazing angle. With prior knowledge of the shape of the seafloor (i.e. flat, or whatever contours are extracted by a bathymetric sonar) it is possible to accommodate variations in the vertical angle. By modeling the bottom as a manifold with embedded point scatterers, it is possible to use grazing angle compensation to compensate for differences in the grazing angle.

Grazing angle compensation scales the pitch of the echo by the secant of the grazing angle. For instance, if a patch of terrain was observed on the horizon (grazing angle=0°) and then observed at a grazing angle of 60°, grazing angle compensation would predict the second echo to be one octave higher than the first. Grazing angle compensation allows for correlation of terrain observed at different grazing angles.

Once the image pair is grazing angle compensated, aspect compensation is performed at block 112. It is known to those of skill in the art that transmitters/receivers can introduce different phase artifacts into the images. It may not be possible to correlate the images without compensating for those artifacts. These artifacts can either be removed or equalized. Removing the artifacts via deconvolution is ideal. However, deconvolution can be problematic since it involves a frequency domain division and some of the terms can be extremely small.

Method 100 utilizes aspect compensation at block 112 such that both images have the same artifacts. Aspect compensation is preferred since it involves frequency domain multiplication instead of the frequency domain division involved in deconvolution and because the resulting images have common zero regions in the frequency domain.

Considering two images of a scene, F(x,y), the expected images are be $I_1(x,y)=F(x,y)*P_1(x,y)$ and $I_2(x,y)=F(x,y)*P_2(x,y)$, where $P_1(x,y)$ and $P_2(x,y)$ are the respective point spread functions for the two images. In the frequency domain, this would be $I_1(k_x,k_y)=F(k_x,k_y)P_1(k_x,k_y)$ and $I_2(k_x,k_y)=F(k_x,k_y)P_2(k_x,k_y)$. For aspect compensation, each frequency domain image is then multiplied by the frequency domain point spread function of the other image, such that the two images of the image pair are equivalent, $I_1(k_x,k_y)P_2(k_x,k_y)I_2(k_x,k_y)P_1(k_x,k_y)$.

Aspect compensation can safely equalize the images for correlation. After aspect compensation the two images will have non-ideal point spread functions due to phase artifacts, but those are removed by the correlation process. While removing or equalizing sonar artifacts through aspect compensation improves correlation performance, those of skill in the art can recognize that correlation can be performed without aspect compensation. Accordingly, block 112 is illustrated in phantom in FIG. 1.

Once the images of the image pair are grazing angle and aspect compensated, block 114 determines if alignment data is available for the images. If alignment data is available, the images can be rotated by the known rotation at block 116 such that they are aligned, noting that no rotation is necessary if the alignment data indicates the images are already aligned. Accordingly, block 116 is illustrated in phantom in FIG. 1. If alignment data is not available, a range of possible rotations and a sampling rate, $\Delta\theta$, can be defined at block 118 and a test image pair is formed for each rotational sample at block 120.

The sampling rate can depend on the resolution desired for correlation, with greater resolution being obtained the smaller $\Delta\theta$ becomes. As an example, it may be known that the images were formed over no more than two quadrants. Hence, the range of possible rotations can be defined as 0° to 180°, with a sampling rate $\Delta\theta=5°$. Thus, test image pairs are formed for 0°, 5°, 10°, ..., and 180°. If greater resolution is desired, a sampling rate of $\Delta\theta=1°$ can be defined, with test image pairs formed for 0, 1°, 2°, 3°, ..., and 180°.

At block 122, the image pair (or test image pair if rotational sampling is needed) is correlated by calculating the correlation coefficient $\rho$ corresponding to each possible image shift $(\Delta x,\Delta y)$, to obtain a correlation image $\rho(\Delta x,\Delta y)$ based on the known relationship, $$\rho_{12}(\Delta x,\ \Delta y) = \frac{\sigma_{12}(\Delta x,\ \Delta y)}{\sigma_1 \sigma_2},$$

where:

$$\sigma_n^2 = \int\int I_n^2(x,y)dxdy - \mu_n^2;$$

$\mu_n = \iint I_n(x,y)dxdy$; and $\sigma_{12}(\Delta x,\Delta y)=\iint I_1(x,y)I_2(\Delta x-x,\Delta y-y)dxdy-\mu_1\mu_2$.

As is known in the art, such calculations can be carried out in a number of ways, without limitation to method 100. For example but not for limitation, the calculations can be carried out by convolving the images and squared images with appropriately sized matrices of ones or by multiplying their Fourier transforms against the Fourier transforms of appropriately sized matrices containing masks of ones. Zero padding can be used in the latter case to prevent circular convolution effects.

If the image pair is not a test image pair, as determined at block 124, the correlation image can be output to the user at block 126. Method 100 can end or return to block 102, 104 to choose further images, as determined at block 128.

If the image pair is a test image pair and is not the last in the series of image pairs, as determined at block 130, Δθ is incremented (block 132) to obtain the corresponding next one of the image pairs and method 100 proceeds to block 122. If there are no further image pairs, as determined at block 130, the correlation image containing the highest correlation coefficient from the set of correlation images obtained from the test image pairs is chosen at block 134 and method 100 proceeds to block 126.

Optionally, as shown in phantom at block 136, the correlation image corresponding to each image pair can be output to the user. Also optionally, the image shift corresponding to the peak correlation coefficient can be output, as indicated in phantom at block 138.

Figure 2:
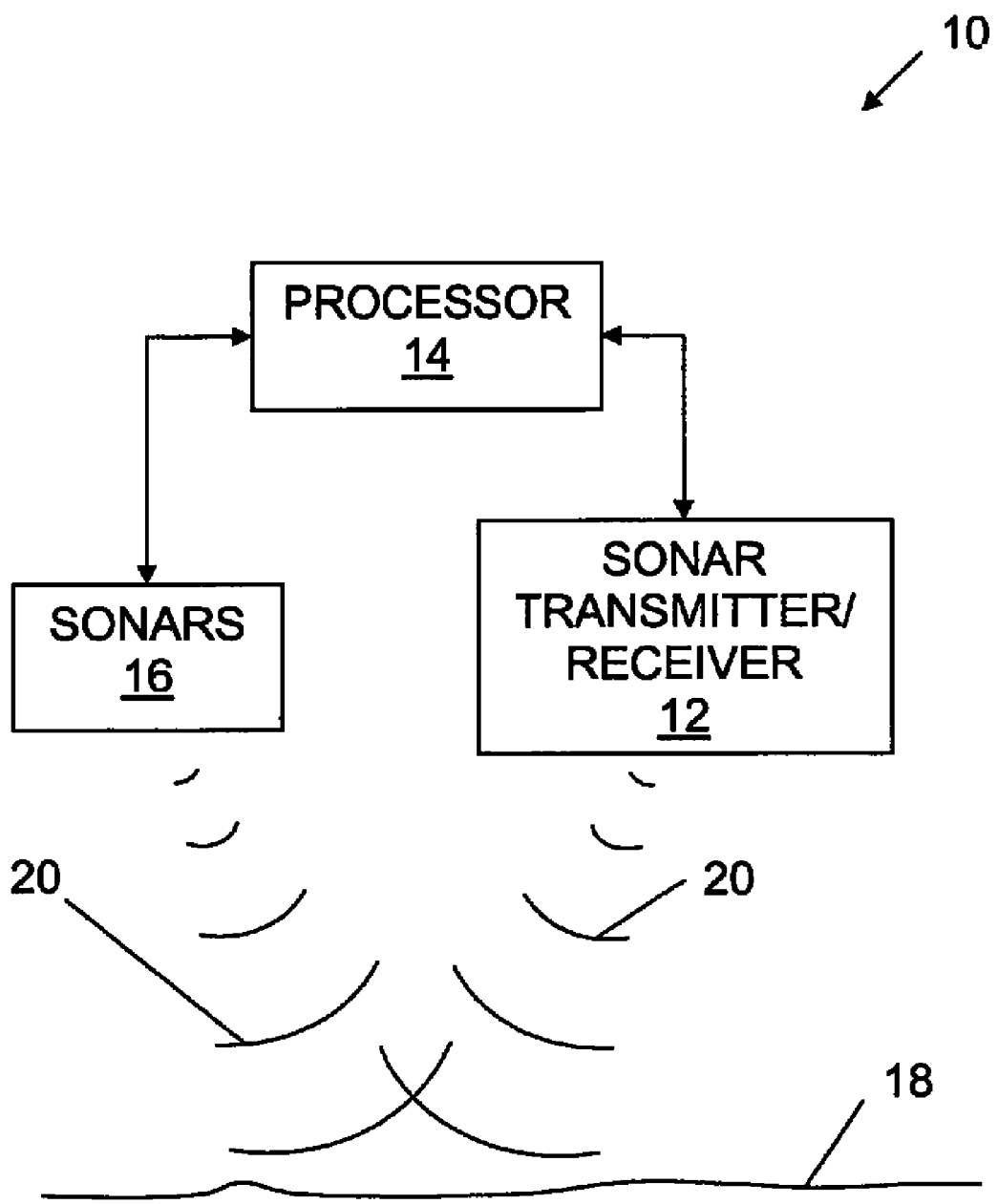
FIG. 2 illustrates a system for coherent image correlation.

Referring now to FIG. 2, there is shown a system 10 having a sonar transmitter/receiver 12 for forming sonar images. Sonar transmitter/receiver 12 is in communication with processor 14 and image data from transmitter/receiver 12 is input to processor 14 for implementation of method 100. Processor 14 can accept sonar image data from additional transmitters/receivers, or sonars, one of which is shown in FIG. 2, designated as reference number 16.

As described previously with respect to method 100, the images chosen for correlation can be chosen from images stored in processor 14, or from real time image data as the images are formed by transmitters/receivers 12 and 16. For images to be correlated, the images are to be formed by sonars, such as sonar transmitters/receivers 12 and 16, having overlapping frequencies that observe terrain 18 from overlapping aspects, as illustrated by arcs 20 in FIG. 2. It will be apparent to those of skill in the art that sonar 16 can represent sonar 12 displaced in time and location.

What have thus been described are systems and methods for coherent image correlation which include sonars with overlapping frequencies that observe terrain from overlapping aspects to form sonar images. The method is implemented on a processor, which can store images received from the sonars, or can process image data in real time as the images are formed.

First and second sonar images are chosen from the stored images, and/or from the real time images, at least one of which is formed using the open or closed aperture theorem. The images are grazing angle compensated and if they are not aligned, a range of possible rotations can be defined and image pairs can be created for a sampling of rotational angles. In addition, the images can be aspect compensated to remove windowing and beam pattern effects, if necessary.

Once both images are grazing angle compensated and aligned, the correlation coefficient for each possible image shift is calculated to obtain a correlation image. If the images were not aligned, the alignment angle can be obtained from the correlation image of the sampling containing the highest correlation coefficient. Optionally, the image shift corresponding to the peak correlation coefficient can be provided.

Obviously many modifications and variations of the present invention may become apparent in light of the above teachings. For example, the systems and methods described herein can be used with radar images.

The ability to correlate sonar (or radar) images is important for a multitude of applications. According to the open/closed aperture theorem, it is possible to fuse information from separate synthetic aperture passes to form a larger/higher resolution synthetic aperture. Coherent image correlation enables this, as it allows images to be co-registered for coherent fusion.

Likewise, coherent correlation allows for mosaicking and multi-pass image fusion for speckle reduction. Overlapping images can be stitched together (mosaicked) once they are co-registered. If the same scene is observed multiple times, the images can be fused to reduce speckle once they are co-registered.

Additionally, coherent correlation also allows for high resolution navigation. For instance, a survey performed with a synthetic aperture sonar can be used as a prior map for secondary robots with inexpensive real aperture sonars. Also, coherent correlation can be used for object recognition by comparing sonar images to libraries of known targets.

Further, coherent correlation can be used for change detection. Images of terrain can be co-registered and correlated on a patch by patch basis. Patches of the sea floor that no longer correlate with prior imagery can be flagged for further inspection. Coherent correlation can also be used for multi-image focusing. Synthetic aperture sonar images often degrade due to vehicle surging. The signals from individual sonar elements from one synthetic array can be correlated against a second synthetic aperture image to estimate such along-track motion.

It will be understood that many additional changes in details, materials, and arrangements of parts which have been described herein and illustrated in order to explain the nature of the invention, may be made by those skilled in the art within the principle and scope of the invention as expressed in the appended claims.

What is claimed is:

1. A method of coherent image correlation, comprising the steps of:

obtaining an open/closed aperture theorem conformal image;

obtaining a second image, said conformal image and said second image being one of a sonar and a radar image;

grazing angle compensating said conformal image and said second image; and correlating said conformal image and said second image;

wherein correlating comprises calculating a correlation coefficient ρ corresponding to each possible image shift (Δx,Δy); and wherein calculating a correlation coefficient comprises obtaining a correlation image ρ(Δx,Δy) based on $$\rho_{12}(\Delta x, \Delta y) = \frac{\sigma_{12}(\Delta x, \Delta y)}{\sigma_1 \sigma_2},$$

where:

$$\sigma_n^2 = \int\int I_n^2(x,y)\,dx\,dy - \mu_n^2;$$

$$\mu_n = \int\int I_n(x,y)\,dx\,dy;$$

$$\sigma_{12}(\Delta x,\Delta y) = \int\int I_1(x,y)I_2(\Delta x-x,\Delta y-y)\,dx\,dy - \mu_1\mu_2;\text{ and}$$

$I_1(x,y)$, $I_2(x,y)$ denote said conformal image and said second image, respectively.

2. A method according to claim 1, further comprising compensating for phase artifacts in said conformal image and said second image prior to correlating.

3. A method according to claim 2, wherein compensating comprises removing said artifacts via deconvolution.

4. A method according to claim 2, wherein compensating comprises:
   obtaining a first frequency domain image $I_1(k_x,k_y)=F(k_x,k_y)P_1(k_x,k_y)$ for said conformal image, $I_1(x,y)=F(x,y)*P_1(x,y)$, where $F(x,y)$ corresponds to a scene imaged in said conformal image and said second image, $P_1(x,y)$ denotes a point spread function of said conformal image, and $k_x$ and $k_y$ are respective frequency domain equivalents of x and y;
   obtaining a second frequency domain image $I_2(k_x,k_y)=F(k_x,k_y)P_2(k_x,k_y)$ for said second image, $I_2(x,y)=F(x,y)*P_2(x,y)$, where $P_2(x,y)$ denotes a frequency domain point spread function of said second image;
   multiplying said first frequency domain image by said frequency domain point spread function of said second image; and
   multiplying said second frequency domain image by said frequency domain point spread function of said conformal image.

5. A method according to claim 1, wherein, prior to correlating, said method further comprises:
   determining if alignment data is available; and
   aligning said conformal image and said second image prior by rotating one of said conformal image and said second image through a rotation obtained from said alignment data.

6. A method according to claim 1, further comprising:
   rotating, prior to correlating and when alignment data is not available, one of said conformal image and said second image through a sample rotation;
   recursively correlating and incrementing said sample rotation until a predetermined total rotation is reached so as to obtain a plurality of correlation images; and
   choosing a one of said plurality of correlation images containing a highest correlation coefficient.

7. A method according to claim 1, wherein grazing angle compensating comprises scaling a pitch of each echo forming said conformal image and said second image by a secant of an angle between said echo and a surface reflecting said echo.

8. A method of coherent image correlation, comprising the steps of:
   obtaining an open/closed aperture theorem conformal image, $I_1(x,y)$;
   obtaining a second image, $I_2(x,y)$, said conformal image and said second image being one of a sonar image and a radar image;
   grazing angle compensating said conformal image and said second image;
   compensating for phase artifacts in said conformal image and said second image;
   when alignment data is available, aligning said conformal image and said second image prior by rotating one of said conformal image and said second image through a rotation obtained from said alignment data;
   when alignment data is not available, rotating one of said conformal image and said second image through a sample rotation;
   obtaining a correlation image $\rho(\Delta x, \Delta y)$ based on $$\rho_{12}(\Delta x,\ \Delta y) = \frac{\sigma_{12}(\Delta x,\ \Delta y)}{\sigma_1 \sigma_2},$$

where:

$$\sigma_n^2 = \int\int I_n^2(x,y)\,dx\,dy - \mu_n^2,$$

$\mu_n = \iint I_n(x,y)dxdy$;

$\sigma_{12}(\Delta x, \Delta y) = \iint I_1(x,y)I_2(\Delta x-x, \Delta y-y)dxdy - \mu_1\mu_2$; and when alignment data is not available, recursively correlating and incrementing said sample rotation until a predetermined total rotation is reached so as to obtain a plurality of correlation images, and choosing a one of said plurality of correlation images containing a highest correlation coefficient.

9. A method according to claim 8, wherein compensating for phase artifacts comprises removing said artifacts via deconvolution.

10. A method according to claim 8, wherein compensating comprises:
   multiplying a frequency domain image of said conformal image by a frequency domain point spread function of said second image; and
   multiplying a frequency domain image of said second image by a frequency domain point spread function of said conformal image.

11. A method according to claim 8, wherein grazing angle compensating comprises scaling a pitch of each echo forming said conformal image and said second image by a secant of an angle between said echo and a surface reflecting said echo.

12. A system for correlating coherent images, comprising:
   a first sonar transmitter/receiver;
   a second sonar transmitter/receiver, said first and second transmitter/receivers having overlapping frequencies, said first and second transmitter/receivers observing terrain from overlapping aspects;
   a processor in communication with said first and second transmitter/receivers; and
   a processor program product disposed on a processor readable medium, and having instructions for causing said processor to
      obtain an open/closed aperture theorem conformal image from said first and second transmitter/receivers,
      obtain a second image from said first and second transmitter/receivers,
      grazing angle compensate said conformal image and said second image, and
      correlate said conformal image and said second image by calculating a correlation coefficient $\rho$ corresponding to each possible image shift $(\Delta x, \Delta y)$ by obtaining a correlation image $\rho(\Delta x, \Delta y)$ based on $$\rho_{12}(\Delta x,\ \Delta y) = \frac{\sigma_{12}(\Delta x,\ \Delta y)}{\sigma_1 \sigma_2},$$

where:

$$\sigma_n^2 = \int\int I_n^2(x,y)\,dx\,dy - \mu_n^2;$$

$\mu_n = \iint I_n(x,y)dxdy$;

$\sigma_{12}(\Delta x, \Delta y) = \iint I_1(x,y)I_2(\Delta x-x, \Delta y-y)dxdy - \mu_1\mu_2$; and $I_1(x,y)$, $I_2(x,y)$ denote said conformal image and said second image, respectively.

13. A system according to claim 12, wherein said processor program product has further instructions for compensating for phase artifacts in said first and second transmitter/receivers, said instructions causing said processor to:

multiply a frequency domain image of a first one of said images by a frequency domain point spread function of a second one of said images; and multiply a frequency domain image of said second one by a frequency domain point spread function of said first one.

14. A system according to claim 13, wherein said instructions for causing said processor to compensate for grazing angle comprise instructions for causing said processor to scale a pitch of each echo forming said images by a secant of an angle between said echo and said terrain.

* * * * *